3,294,629
FLUORONITROBENZENE NEMATOCIDES
William J. Pyne and Fred L. Metz, Painesville, Henry Bluestone, University Heights, and Alfred Hirsch, Mentor, Ohio, assignors to Diamond Alkali Company, Cleveland, Ohio, a corporation of Delaware
No Drawing. Filed May 11, 1964, Ser. No. 366,660
13 Claims. (Cl. 167—30)

This invention relates to improvements in the control of soil-infesting organisms and, more particularly, relates to parasiticidal compositions useful in the control of nematodes which contain as the active ingredient certain substituted nitrobenzenes.

Plants attacked by nematodes are damaged primarily due to the feeding of the nematodes on the plant tissues, one of the most common and easily recognized types of nematode damage being the "root knot" disease, so called because of root knot or gall formations found on the root system of the diseased plant. These root knots or galls contain nematodes, nematode egg masses, and/or larvae. These formations in the roots of the plant not only reduce the size and effectiveness of the root system by rotting or otherwise destroying the roots but also seriously affect other plant tissues with the result that, unless treated, the plant dies. Even in those instances where plants attacked by nematodes are not completely destroyed, the plants generally are weakened even though there may be no visible injury to any part of the plant above the ground.

We have now found that certain substituted nitrobenzenes exhibit a high degree of biological activity and are especially useful as parasiticidal substances for the control of nematodes and other similar soil-infesting organisms. These substituted nitrobenzenes have the structure

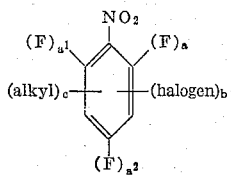

wherein $a$, $a^1$ and $a^2$ are each 0 to 1, inclusive, with the proviso that at least one of $a$, $a^1$ and $a^2$ is 1; $b$ is 0 to 4, inclusive; and $c$ is 0 to 4, inclusive; any free bonds being satisfied by hydrogen.

More particularly, substituted nitrobenzenes conforming to the above generic structure which are most effectively employed and are preferred for use herein have the structure:

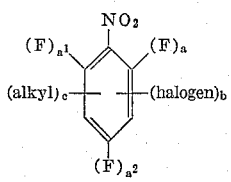

wherein $a$, $a^1$ and $a^2$ are as defined above; $b$ is 0 to 2, inclusive; and $c$ is 0 to 2, inclusive; any free bonds being satisfied by hydrogen.

Illustrative of specific compounds of this type are:
5-chloro-2,4-difluoronitrobenzene,
2,5-dichloro-4-fluoronitrobenzene,
4,5-dichloro-2-fluoronitrobenzene,
4-fluoronitrobenzene,
2-fluoronitrobenzene,
2,4-difluoronitrobenzene,
3-chloro-4-fluoronitrobenzene,
2,4,6-trifluoronitrobenzene,
3,5-dichloro-2,4-difluoronitrobenzene,
5-chloro-2-fluoronitrobenzene,
4-fluoro-5-methylnitrobenzene,
2-fluoro-5-methylnitrobenzene,
4-fluoro-2-methylnitrobenzene,
5-bromo-2-fluoronitrobenzene.

Additionally, we have found that mixtures of these substituted nitrobenzenes as, for example, an isomeric mixture of 2,5-dichloro-4-fluoronitrobenzene and 4,5-dichloro-2-fluoronitrobenzene, also may be effectively applied as nematocides.

In using the nematocidal compositions of this invention, they can be applied as such or can be extended with a liquid or solid diluent. The active compounds can, for example, be combined or formulated into suitable compositions for spraying or drenching or, if desired, formulated as an emulsifiable concentrate. Alternatively, the compounds can, of course, be formulated into appropriate use compositions by mixing a toxic amount thereof with a conditioning agent of the kind used and referred to in the art as a pest control adjuvant. In addition to the above-described application methods, i.e., drenching or spraying, it may be advantageous, in many instances, to introduce the compositions directly into the soil by hand or mechanical sub-soil injectors. In general, excellent results have been obtained in sub-soil applications when the compositions of this invention are introduced into the soil to a depth of 6 inches or less. The term "soil" as used herein is intended to include any substance or medium capable of supporting the growth of plants. In addition to soil it is, therefore, intended to include pumice, manure, compost, sand and artificially created plant growth media, including solutions and/or other hydroponic media.

Solid compositions, preferably in the form of wettable powders, are compounded to give homogeneous free-flowing powder by mixing the active ingredient with finely-divided solids, Attaclays, diatomaceous earth, synthetic fine silica or soils such as walnut shells, redwood, soybeans, cottonseed flour or other solid conditioning agents or carriers of the kind conventionally employed in preparing pest control compositions in solid or liquid form.

Even more preferable among the solid compositions, in some instances, are granules or pellets when the application is primarily to the soil. Granules may be prepared by impregnating granular diluents such as granular Attaclay with those compounds which are liquids; when the compounds are solids, granules may be made by first extending the powdered compound with powdered diluent and subsequently granulating. Pellets may be made, for example, by extruding moistened, powdered mixtures under high pressure through dies.

If a liquid drench or spray material is desired, such compositions can be prepared by mixing the active ingredient with a suitable liquid diluent medium. The resulting composition can be in the form of either a solution, emulsion, or suspension of the active ingredient.

The nematocidal compositions of this invention, whether in the form of solids or liquids, for most applications can also include a surface-active agent of the kind sometimes referred to in the art as a wetting, dispersing or emulsifying agent. These agents, which will be referred to hereinafter more simply as surface-active agents, cause the compositions to be easily dispersed in water to give aqueous sprays.

The surface-active agents employed can be of the anionic, cationic or non-ionic type and include, for example, sodium and potassium oleate, the amine salts of oleic acid such as morpholine and dimethyl amine oleates, the sulphonated animal and vegetable oils such as sulphonated fish and castor oils, sulphonated petroleum oils, sulphonated acyclic hydrocarbons, sodium salt of lignon sulphonic acid (goulac), alkyl naphthylene sodium sulphonate and other wetting, dispersing and emulsifying agents such as those listed in articles by McCutchin in "Soap and Chemical Specialties," vol. 31, Nos. 7–10 (1955), including, for example, the material known as Triton X–155 (100% alkyl aryl polyether alcohol—U.S. Patent No. 2,504,064). Generally, the surface-active agent will not comprise more than about 5 percent to 15 percent by weight of the composition depending of course upon the particular surface-active agent, the system in which it is placed, and the result desired; in certain compositions, the percentage will be 1 percent or less. Usually the minimum lower concentration will be 0.1 percent.

The active compound is, of course, applied in an amount sufficient to exert desired nematocidal action. As stated previously, the amount of the active ingredient or mixture thereof present in the composition as actually applied will depend to a large degree upon the particular application contemplated, i.e., the particular nematodes for which control is sought, the purposes for which the application is being made and like variables. In general, however, the nematocidal compositions will contain from about 0.5 percent to 95 percent by weight of the active ingredient.

Also, fertilizing materials, herbicidal agents and/or other pest control agents such as insecticides and fungicides can be included in the biologically-active compositions of the invention, if desired.

Of the substituted nitrobenzenes enumerated hereinabove which we have found to be effective as nematocides, all are known compounds, with the exception of 3,5-dichloro-2,4-difluoronitrobenzene, the preparation of which is set forth in a specific example hereinafter. The known materials are, in most instances, available commercially and may be synthesized by various means. Typically, they may be prepared by exchanging, for example, the chlorine atoms in the ortho- and/or para-positions in the ring structure of a chloro-substituted nitrobenzene with fluorine atoms, the said atom exchange being effected by reacting, in an appropriate solvent (e.g., dimethyl sulfoxide) at a temperature ranging from about 90° C. to the reflux temperature of the mixture, and for a time period of 1 to 35 hours, the chloro-substituted nitrobenzene with anhydrous potassium fluoride. Generally, a ratio of from 1.1 to 3 moles of potassium fluoride is employed for each chlorine atom to be exchanged in the substituted nitrobenzene. The chloro-substituted nitrobenzene used in the reaction generally is prepared by nitrating at a temperature of 15° to 20° C., a chloro-substituted benzene with nitric acid in the presence of sulfuric acid.

The substituted nitrobenzenes useful herein predominantly are liquid materials which, after preparation by the exchange reaction as described, are isolated and purified either by vacuum or by steam distillation. If solids, the product compounds are purified generally by recrystallization from suitable solvents. It will be understood, of course, that pure compounds need not necessarily be completely isolated and that purification is generally practicable only to the extent necessary for removing by-products and/or impurities, which would disadvantageously affect the biological activity of the compounds. As pointed out previously herein, it is also not necessary, in many instances, to separate isomeric mixtures of these compounds as prepared, since such mixtures likewise exhibit effective nematocidal activity.

In order that those skilled in the art may more completely understand the present invention and the preferred methods by which the same may be carried into effect, the following specific examples are offered.

EXAMPLE 1

*Preparation of 3,5-dichloro-2,4-difluoronitrobenzene*

Fifty grams of 2,3,4,5-tetrachloronitrobenzene (obtained from Columbia Organic Chemicals Company) is dissolved in 150 ml. of dimethyl sulfoxide solvent in a 300-ml., three-necked flask fitted with a magnetic stirrer, a thermometer and a condenser. Thirty g. of potassium fluoride is added to this solution and the agitated mixture is then heated to 110° C. and maintained at this temperature for 7 hours. The reaction mixture is then cooled and poured into about 700 ml. of water. The oily layer which forms is taken up in about 60 ml. of chloroform. This extract is washed 3 times with water, dried and then concentrated under reduced pressure. Vacuum distillation of the concentrate yields 15 g. of a yellow oil having a boiling point of 71° to 71.5° C. at a pressure of 2 mm. of mercury and having a refractive index, $n_D^{20}$, of 1.5528. This product is identified as 3,5-dichloro-2,4-difluoronitrobenzene, $C_6H_1Cl_2F_2NO_2$, by the following elemental analytical data:

| Element | Actual Percent by Wt. | Calculated Percent by Wt. |
|---|---|---|
| C | 31.9 | 31.7 |
| H | 0.5 | 0.44 |

EXAMPLE 2

To illustrate the nematocidal activity of the compositions of this invention, composted greenhouse soil, diluted with clean washed sand, is placed in one-half gallon glazed crocks and infested with knotted or galled tomato roots containing root-knot nematodes, Meloidogyne species. Treatment is accomplished by mixing the test formulation intimately with the soil if a solid, or by drenching, if a liquid, paste, or of gummy consistency. The formulation contains the test chemical, acetone, stock emulsifier and distilled water and is applied at a concentration equal to 32 pounds of test chemical per acre or less. Additionally, other soil crocks are infested with galled tomato roots and treated with similar concentrations of commercially available nematocidal materials for comparative purposes.

After treatment, all containers are stored at 20° C. where they are covered with plastic to maintain moisture. Seven days after treatment, the soil in each container is thoroughly mixed, returned to the container and three seeding tomatoes are transplanted therein. After three weeks in the greenhouse the plants are carefully removed from the soil and roots are inspected for nematode galls. A rating of infection from 0 to 10 is recorded: 0=no galls or complete control and 10=heavily galled roots comparable to controls. Each of the three root systems is rated separately and the average is multiplied by 10 and subtracted from 100 to give percent nematode control. In addition to the infested containers, usually three pots of similar non-infested controls are included in the test. Results of the test are as follows:

TABLE I

| Compound | Percent Root-knot Control at lbs./acre | | | |
|---|---|---|---|---|
| | 32 | 16 | 8 | 4 |
| 2,4-difluoronitrobenzene | 100 | 100 | 90 | 90 |
| 3-chloro-4-fluoronitrobenzene | 100 | 100 | 93 | 67 |
| 2-fluoronitrobenzene | 97 | 90 | 77 | 40 |
| 5-chloro-2-fluoronitrobenzene | 100 | 100 | 80 | 70 |
| 2,4,6-trifluoronitrobenzene | 90 | 93 | 77 | 27 |
| 5-chloro-2,4-difluoronitrobenzene | 100 | 90 | 63 | 23 |
| 2,5-dicholoro-4-fluoronitrobenzene | 100 | 93 | 73 | 10 |
| 2-fluoro-5-methylnitrobenzene | 84 | 77 | 77 | |
| 5-bromo-2-fluoronitrobenzene | 100 | 80 | | |
| 3,5-dichloro-2,4-difluoronitrobenzene | 97 | 64 | | |
| 4-fluoronitrobenzene | 83 | | | |
| 4-fluoro-2-methylnitrobenzene | 50 | | | |
| Isomeric mixture of: 2,5-dichloro-4-fluoronitrobenzene (84%) 4,5-dichloro-2-fluoronitrobenzene (16%) | 100 | 80 | 60 | |

In a similar test, ethylene dibromide (a commercial nematocide manufactured by Michigan Chemical Corporation) exhibited 77 percent and 70 percent root-knot control when employed at concentrations of 32 pounds per acre and 16 pounds per acre, respectively. Nemagon (1,2-dibromo-3-chloropropane, manufactured by Shell Chemical Company and used commercially as a nematocide) exhibited 90, 73 and 27 percent root-knot control at concentrations of 32 pounds, 16 pounds and 8 pounds per acre, respectively, but showed no effectiveness when employed at a concentration of 4 pounds per acre. Likewise, Vorlex (a mixture of methyl isothiocyanate (20%) in mixed chlorinated $C_3$ hydrocarbons (80%), manufactured by Morton Chemical Company and used as a commercial nematocide) exhibited 80 percent root-knot control at a concentration of 16 pounds per acre, but was non-effective when applied at a concentration of 8 pounds per acre.

EXAMPLE 3

*Panagrellus test*

To further illustrate the nematocidal effectiveness of the compositions of this invention, nonplant-parasitic nematodes (*Panagrellus redivivus*) are exposed to 5-chloro-2,4-difluoronitrobenzene. For the test, three small watch glasses placed within a Petri dish are used, two receiving appropriate dosages of the test formulation containing the test compound, acetone, stock emulsifier solution and distilled water, and the third receiving the same dosage of distilled water. Additionally, other Petri dishes containing watch glasses with similar concentrations of known nematocidal materials are also included for comparative purposes. After all of the test dishes have been set up in this manner, the *Panagrellus* suspension is added to each watch glass. After these additions are made, the Petri dishes are closed. The watch glass in the center of each dish, containing only water and nematodes, detects fumigant action. The other two containing chemical and nematodes measure contact activity.

The organism is grown on cooked oatmeal which is sterilized in the autoclave before being centrally inoculated from an old culture. The culture is held at 22° C. and after 10 to 14 days the surface of the oatmeal is swarming with nematodes which are visible to the eye. Such a culture is used to prepare the test suspension. The concentration of the nematodes is adjusted so that each watch glass contains 30 to 40 nematodes. At the end of 48 hours mortality counts are made from which percent kill can be determined. Using this procedure, the following results are obtained:

TABLE II
[Contact Action of Chemical]

| Compound | Percent Mortality at Concentration of Test Chemical (p.p.m.) | | |
| --- | --- | --- | --- |
| | 200 | 75 | 25 |
| 5-chloro-2,4-difluoronitrobenzene | 100 | 100 | 90 |
| Nemagon [1] | 0 | 0 | 0 |
| Mylone [2] | 100 | 0 | 0 |
| Ethylene dibromide [3] | 0 | 0 | 0 |

[1] As described in Example 2.
[2] 3,5-dimethyl-1,3,5-2H-tetrahydrothiadiazine-2-thione—Commercial nematocide—Union Carbide.
[3] As described in Example 2.

TABLE III
[Fumigant Action of Chemical]

| Compound | Percent Mortality at Concentration of Test Chemical (p.p.m.) | | |
| --- | --- | --- | --- |
| | 200 | 75 | 25 |
| 5-chloro-2,4-difluoronitrobenzene | 100 | 100 | 57 |
| Nemagon [1] | 0 | 0 | 0 |
| Mylone [2] | 45 | 0 | 0 |
| Ethylene dibromide [3] | 0 | 0 | 0 |

See footnotes at end of Table II.

EXAMPLE 4

Using the procedure of Example 3, the nematocidal activity of other fluoronitrobenzene compounds embodying the present invention is determined against *Panagrellus redivivus*, with the following results:

TABLE IV

| Compound | Percent Mortality at Concentration of Test Chemical (p.p.m.) | | | |
| --- | --- | --- | --- | --- |
| | Contact | | Fumigant | |
| | 1,000 | 100 | 1,000 | 100 |
| 2,5-dichloro-4-fluoronitrobenzene | 100 | 100 | 100 | 100 |
| 3,5-dichloro-2,4-difluoronitrobenzene | 100 | 100 | 100 | 100 |
| 5-chloro-2-fluoronitrobenzene | 100 | 100 | 100 | 100 |
| 5-bromo-2-fluoronitrobenzene | 100 | 100 | 100 | 100 |
| 3-chloro-4-fluoronitrobenzene | 100 | 84 | 100 | 94 |
| 5-methyl-2-fluoronitrobenzene | 100 | 95 | 100 | 70 |

Data in the above Tables II, III and IV indicate that by comparison to commercial nematocides similarly tested, the fluoronitrobenzenes of this invention exhibit vastly improved nematocidal activity both by fumigant action as well as by direct contact with the organisms.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of controlling nematode infestation in soil which comprises applying to nematode-infested soil a nematocidal amount of a substituted nitrobenzene having the structure:

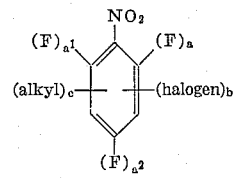

wherein $a$, $a^1$ and $a^2$ are each 0 to 1, inclusive, with the proviso that at least one of $a$, $a^1$ and $a^2$ is 1; $b$ is 0 to 4, inclusive; and $c$ is 0 to 4, inclusive, any free bonds being satisfied by hydrogen, with the further proviso that when $c$ is 0, at least two of $a$, $a^1$, $a^2$ and $b$ is 1.

2. The method of controlling nematodes infestation in soil which comprises applying to said nematode-infested soil a nematocidal amount of 2,4-difluoronitrobenzene.

3. The method of controlling nematode infestation in soil which comprises applying to said nematode-infested soil a nematocidal amount of 3-chloro-4-fluoronitrobenzene.

4. The method of controlling nematode infestation in soil which comprises applying to said nematode-infested soil a nematocidal amount of 5-chloro-2-fluoronitrobenzene.

5. The method of controlling nematode infestation in soil which comprises applying to said nematode-infested soil a nematocidal amount of 2,4,6-trifluoronitrobenzene.

6. The method of controlling nematode infestation in soil which comprises applying to said nematode-infested soil a nematocidal amount of 5-chloro-2,4-difluoronitrobenzene.

7. The method of controlling nematode infestation in soil which comprises applying to said nematode-infested soil a nematocidal amount of 2,5-dichloro-4-fluoronitrobenzene.

8. The method of controlling nematode infestation in soil which comprises applying to said nematode-infested soil a nematocidal amount of 2-fluoro-5-methylnitrobenzene.

9. The method of controlling nematode infestation in soil which comprises applying to said nematode-infested soil a nematocidal amount of 5-bromo-2-fluoronitrobenzene.

10. The method of controlling nematode infestation in soil which comprises applying to said nematode-infested soil a nematocidal amount of 3,5-dichloro-2,4-difluoronitrobenzene.

11. The method of controlling nematode infestation in soil which comprises applying to said nematode-infested soil a nematocidal amount of a mixture of 2,5-dichloro-4-fluoronitrobenzene and 4,5-dichloro-2-fluoronitrobenzene.

12. The method of controlling nematode infestation in soil which comprises applying to said nematode-infested soil a nematocidal amount of 4-fluoro-2-methylnitrobenzene.

13. The method of controlling nematode infestation in soil which comprises applying to said nematode-infested soil a nematocidal amount of 4-fluoro-5-methylnitrobenzene.

References Cited by the Examiner

UNITED STATES PATENTS

| | | | |
|---|---|---|---|
| 1,947,926 | 2/1934 | Stiendorff | 167—30 |
| 2,519,317 | 8/1950 | Kolka | 260—646 |
| 2,819,197 | 1/1958 | Santmyer | 167—30 |
| 2,865,803 | 12/1958 | Lewis | 167—30 |
| 3,140,319 | 7/1964 | Sparks | 260—646 |

FOREIGN PATENTS

| | | |
|---|---|---|
| 117,464 | 9/1943 | Australia. |
| 615,447 | 2/1961 | Canada. |
| 157,465 | 1/1957 | Sweden. |

OTHER REFERENCES

Chemical Abstracts 53:13091$h$ (1959).
Chemical Abstracts 53:13092$b$ (1959).
Chemical Abstracts 57:12358$i$ to 57:12359$a$ (1962).
Chemical Abstracts 58:9085$d$ (1963).
Chemical Abstracts 59:5716$h$ (1963).

SAM ROSEN, *Primary Examiner.*

JULIAN S. LEVITT, *Examiner.*

J. D. GOLDBERG, *Assistant Examiner.*